United States Patent
Chen et al.

(10) Patent No.: US 9,661,506 B2
(45) Date of Patent: May 23, 2017

(54) TRANSCEIVER ARCHITECTURE FOR MULTIPLE ANTENNA SYSTEMS

(71) Applicant: MEDIATEK INC., Hsinchu (TW)

(72) Inventors: Ju-Ya Chen, Kaohsiung (TW); Jing-Hong Conan Zhan, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/249,562

(22) Filed: Aug. 29, 2016

(65) Prior Publication Data

US 2016/0373938 A1 Dec. 22, 2016

Related U.S. Application Data (63) Continuation of application No. 14/941,775, filed on Nov. 16, 2015, now Pat. No. 9,445,282.

(Continued)

(51) Int. Cl.
*H04B 7/08* (2006.01)
*H04W 16/28* (2009.01)
(Continued)

(52) U.S. Cl.
CPC .............. *H04W 16/28* (2013.01); *H01Q 3/38* (2013.01); *H04B 7/0695* (2013.01); *H04B 7/086* (2013.01); *H04B 7/0851* (2013.01)

(58) Field of Classification Search
CPC ... H04B 7/00; H04B 7/02; H04B 7/08; H04B 7/0837; H04B 7/0842; H04B 7/086;
(Continued)

(56) References Cited

U.S. PATENT DOCUMENTS

| | | | |
|---|---|---|---|
| 6,094,165 A | 7/2000 | Smith | 342/373 |
| 2013/0258972 A1 | 10/2013 | Kim et al. | 370/329 |

(Continued)

FOREIGN PATENT DOCUMENTS

| | | |
|---|---|---|
| GB | 2332304 A | 6/1999 |
| WO | WO2013169055 A1 | 11/2013 |

OTHER PUBLICATIONS

International Search Report and Written Opinion of International Search Authority for PCT/CN2015/094764 dated Feb. 5, 2015 (12 pages).

*Primary Examiner* — Siu Lee
(74) *Attorney, Agent, or Firm* — Imperium Patent Works; Zheng Jin (57) ABSTRACT

A transceiver architecture with combined digital beamforming and analog/hybrid beamforming is proposed. Digital beamforming is used for beam training with reduced overhead (switching time). It is beneficial to estimate all UE's angle of arrival (AoA) at the same time. In addition, the pilot/training signals are transmitted in a narrow band to reduce complexity. Analog/hybrid beamforming is used for data transmission with high directive gain and low complexity. The value of beamforming weights (phase shifter values) in analog domain can be based on the estimation of AoA from beam training. By using digital beamforming for beam training, combined with analog/hybrid beamforming for data transmission, effective beamforming is achieved with reduced overhead, complexity, and cost.

22 Claims, 7 Drawing Sheets

Related U.S. Application Data

(60) Provisional application No. 62/080,626, filed on Nov. 17, 2014.

(51) Int. Cl.
*H04B 7/06* (2006.01)
*H01Q 3/38* (2006.01)

(58) Field of Classification Search
CPC .. H04B 7/0862; H04B 7/0891; H04B 7/0897; H04B 7/0851; H04B 7/0695; H01Q 3/38; H04W 16/28
USPC ....... 375/316, 259, 260, 267, 278, 285, 340, 375/346, 347, 349
See application file for complete search history.

(56) References Cited

U.S. PATENT DOCUMENTS

| | | | |
|---|---|---|---|
| 2013/0301454 A1* | 11/2013 | Seol | H04B 7/043 370/252 |
| 2014/0307654 A1* | 10/2014 | Kim | H04B 7/0617 370/329 |
| 2015/0103934 A1* | 4/2015 | Nam | H04B 7/0413 375/260 |
| 2015/0282122 A1* | 10/2015 | Kim | H04L 25/03898 370/329 |

\* cited by examiner

TRANSCEIVER ARCHITECTURE FOR MULTIPLE ANTENNA SYSTEMS

CROSS REFERENCE TO RELATED APPLICATIONS

This application is a continuation, and claims priority under 35 U.S.C. §120 from nonprovisional U.S. patent application Ser. No. 14/941,775, entitled "Transceiver Architecture for Multiple Antenna Systems," filed on Nov. 16, 2015, the subject matter of which is incorporated herein by reference. Application Ser. No. 14/941,775, in turn, claims priority under 35 U.S.C. §119 from U.S. Provisional Application No. 62/080,626, entitled "Transceiver Architecture for Multiple Antenna Systems," filed on Nov. 17, 2014; the subject matter of which is incorporated herein by reference.

TECHNICAL FIELD

The disclosed embodiments relate generally to wireless communication, and, more particularly, to transceiver architecture with hybrid beamforming for multiple antenna systems.

BACKGROUND

The bandwidth shortage increasingly experienced by mobile carriers has motivated the exploration of the underutilized Millimeter Wave (mmWave) frequency spectrum between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

With recent advances in mmWave semiconductor circuitry, mmWave wireless system has become a promising solution for real implementation. However, the heavy reliance on directional transmissions and the vulnerability of the propagation environment present particular challenges for the mmWave network. In mmWave or high frequency systems, directional antenna is utilized to provide higher gain to compensate the pathloss. Directional antenna can be implemented by phased array with many antenna elements. Beamforming and spatial multiplexing methods can be applied in multiple antenna systems. Analog, digital, or hybrid beamforming technique is used in phased array antenna systems. Channel state information is needed when beamforming or spatial multiplexing is applied.

Channel state information can be obtained by estimating either uplink or downlink pilot training symbols. In beamforming technique, angle of arrival (AoA) is one of the channel state information. By adjusting the values of phase shifters, the beam direction in phased array systems can be steered accordingly. In analog beamforming, a set of phase shifter values can be only applied in one training period. One specific antenna pattern is associated with a set of phase shifter values. N training periods are needed if N antenna patterns (directions) are to be detected. This is time consuming. On the other hand, in digital beamforming, different phase shifter values can be applied by digital signal processing in one training period. Multiple RF chain is needed (NA antennas need NA RF chains), which results in high complexity.

A solution is sought to solve the problem of high data rate processing and high power consumption in digital beamforming as well as the problem of large overhead of switching time for switching beams in analog or hybrid beamforming.

SUMMARY

A transceiver architecture with combined digital beamforming and analog/hybrid beamforming is proposed. Digital beamforming is used for beam training with reduced overhead (switching time). It is beneficial to estimate all UE's angle of arrival (AoA) at the same time. In addition, the pilot/training signals are transmitted in a narrow band to reduce complexity. Analog/hybrid beamforming is used for data transmission with high directive gain and low complexity. The value of beamforming weights (phase shifter values) in analog domain can be based on the estimation of AoA from beam training. By using digital beamforming for beam training, combined with analog/hybrid beamforming for data transmission, effective beamforming is achieved with reduced overhead, complexity, and cost.

In one embodiment, a base station receives a plurality of data signals carrying data symbols from a set of antenna elements in a beamforming cellular network. The base station performs analog beamforming to process the data symbols. The set of antenna elements are applied with a first set of phase shift values via a set of phase shifters to form a first antenna pattern to receive the plurality of data signals. The base station receives a plurality of training signals carrying training symbols from the set of antenna elements. The base station performs digital beamforming to process the training symbols. The set of antenna elements are applied with a second set of phase shift values via a baseband processor to form a second antenna pattern to receive the plurality of training signals.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
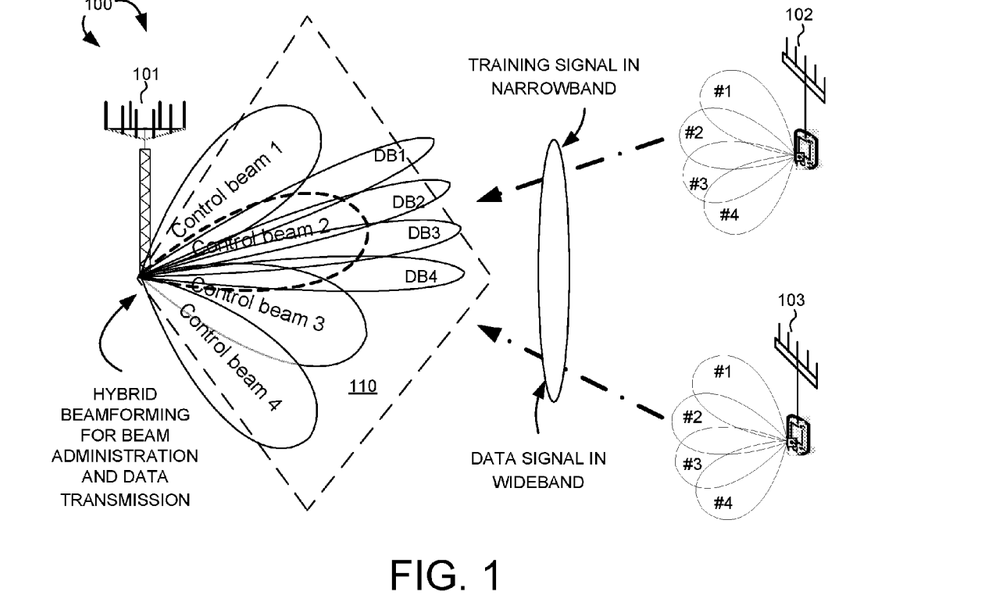
FIG. 1 illustrates combined digital beamforming for beam training with analog/hybrid beamforming for data transmission in a beamforming cellular system in accordance with one novel aspect.

FIG. 1 illustrates combined digital beamforming for beam training with analog/hybrid beamforming for data transmission in a beamforming Millimeter Wave (mmWave) cellular network 100 in accordance with one novel aspect. Beamforming mmWave mobile communication network 100 comprises a base station BS 101 and a first user equipment UE 102 and a second user equipment UE 103. The mmWave cellular network uses directional communications with narrow beams and can support multi-gigabit data rate. Directional communications are achieved via digital (adaptive) and/or analog (switched) beamforming, wherein multiple antenna elements are applied with multiple sets of beamforming weights (phase shift values) to form multiple beam patterns. In the example of FIG. 1, BS 101 is directionally configured with multiple cells, and each cell is covered by a set of coarse TX/RX control beams. For example, cell 110 is covered by a set of four control beams CB1, CB2, cB3, and CB4. The collection of the control beams CB1-CB4 covers an entire service area of cell 110, and each control beam has a wider and shorter spatial coverage with smaller array gain. Each control beam in turn is covered by a set of dedicated data beams. For example, CB2 is covered by a set of four dedicated data beams DB1, DB2, DB3, and DB4. The collection of the dedicated data beams covers a service area of one control beam, and each dedicated data beam has a narrower and longer spatial coverage with larger array gain. Similarly, UE 102 and UE 103 may also apply beamforming to from multiple beam patterns (#1 to #4).

Hierarchical level beam patterns is assumed in wireless or cellular networks. Level 0 beam pattern is omni-directional and used for macro cell stations. The set of control beams are lower-level (Level 1) beams that provide low rate control signaling to facilitate high rate data communication on higher-level (Level 2) dedicated data beams. The set of control beams may be periodically configured or occur indefinitely and repeatedly in order known to the UEs. The set of control beams covers the entire cell coverage area with moderate beamforming gain. Each control beam broadcasts minimum amount of cell-specific and beam-specific information similar to System Information Block (SIB) or Master Information Block (MIB) in LTE systems. The control beam and dedicated data beam architecture provides a robust control-signaling scheme to facilitate the beamforming operation in mmWave cellular network systems.

Maintaining antenna pointing and tracking accuracy is essential in many phases of the communication process. Beam administration mechanism, which includes both initial beam alignment and subsequent beam tracking, ensures that BS beam and UE beam are aligned for control and data communication. There are two types of beamforming: switched (analog or hybrid) beamforming and adaptive (digital) beamforming. The complexity of switched beam forming is low, while beam patterns are not flexible and beam alignment time is long. The complexity of adaptive beamforming is high with flexible beam patterns, while beam alignment time is acceptable.

In according with one novel aspect, a transceiver architecture with combined digital beamforming and analog/hybrid beamforming is proposed. Digital beamforming is used for beam training or beam administration with reduced overhead (switching time). It is beneficial to estimate all UE's angle of arrival (AoA) at the same time. In addition, the pilot/training signals are transmitted in a narrow band to reduce complexity. Analog/hybrid beamforming is used for data transmission with high directive gain and low complexity. The value of beamforming weights (phase shifters) in analog domain can be based on the estimation of AoA from beam training. It is assumed that AoA information is coherent in certain bandwidth. Therefore, by using digital beamforming for beam training, combined with analog/hybrid beamforming for data transmission, effective beamforming is achieved with reduced overhead, complexity, and cost.

Figure 2:
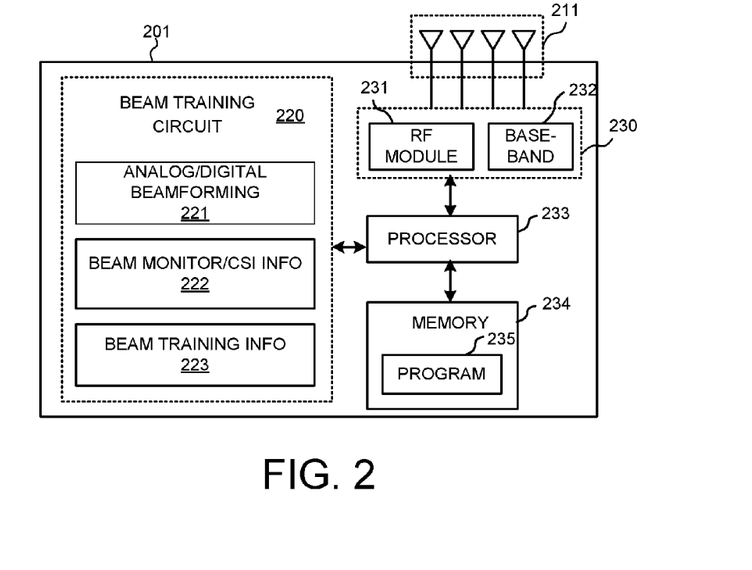
FIG. 2 is a simplified block diagram of a base station or a user equipment that carry out certain embodiments of the present invention.

FIG. 2 is a simplified block diagram of a wireless device 201 that carries out certain embodiments of the present invention. Device 201 has an antenna array 211 having multiple antenna elements that transmits and receives radio signals, a receiver 230 comprising one or more RF transceiver modules 231 and a baseband processing unit 232, coupled with the antenna array, receives RF signals from antenna 211, converts them to baseband signal, and sends them to processor 233. RF transceiver 231 also converts received baseband signals from processor 233, converts them to RF signals, and sends out to antenna 211. Processor 233 processes the received baseband signals and invokes different functional modules to perform features in BS 201. Memory 234 stores program instructions and data 235 to control the operations of device 201. Device 201 also includes multiple function modules that carry out different tasks in accordance with embodiments of the current invention.

The functional modules are circuits that can be implemented and configured by hardware, firmware, software, and any combination thereof. For example, device 201 comprises a beam training circuit 220, which further comprises a beamforming circuit 221, a beam monitor 222, and a beam training information circuit 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams and device channel state information including AoA. Beam training information circuit 223 provides beam training information including training period, window size, and resource mapping information. Based on phased array reciprocity or channel reciprocity, the same receiving antenna pattern can be used for transmitting antenna pattern. Different algorithms can be applied in choosing the best receiving beam, including (but not limited to) power maximization, SINR maximization, or interference minimization.

Figure 3:
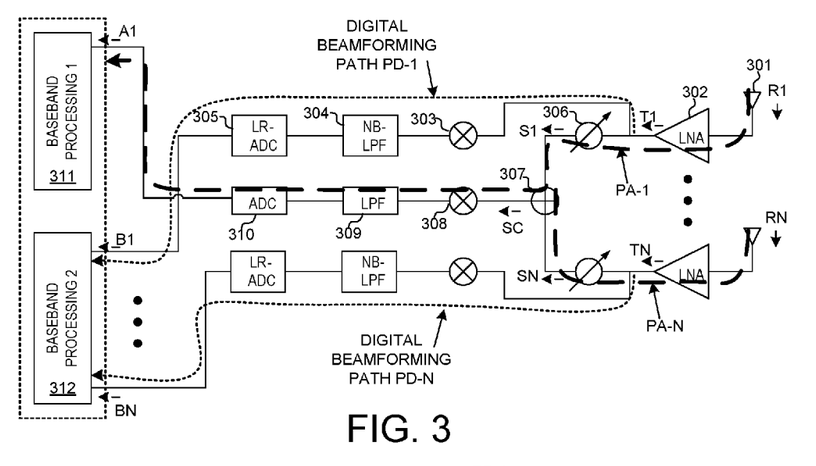
FIG. 3 illustrates a first embodiment of a receiver with combined digital beamforming and analog beamforming.

FIG. 3 illustrates a first embodiment of a receiver with combined digital beamforming and analog beamforming. The receiver comprises components for performing both digital beamforming and analog beamforming. The digital beamformer comprises a plurality of antennas coupled with a plurality of low-noise amplifiers (LNAs), a plurality of mixers, a plurality of narrow-band low-pass filters (NB-LPFs), a plurality of low-rate analog-to-digital converters (LR-ADCs), and a baseband processor 2. The analog beamformer comprises the plurality of antennas coupled with the plurality of low-noise amplifiers (LNAs), a plurality of phase shifters, a signal combining circuit, a mixer, a low-pass filter (LPF), an analog-to-digital converter (ADC), and a baseband processor 1. In accordance with one novel aspect, for beam training, training symbols are transmitted in a narrow band and digital beamforming is applied. For high rate data transmission, data symbols are transmitted in full band or subband and analog beamforming is applied. Furthermore, beam-training symbols can be multiplexed with data symbols in frequency domain and transmitted in the same training period and processed simultaneously.

For beam training, the receiver receives a plurality of narrow band training signals carrying training symbols via N antennas. Each training signal follows the digital beamforming paths PD-1 to PD-N as depicted by the dotted lines. Taking path PD-1 as an example, the training signal is first received by an antenna 301 and passed through an LNA 302. After LNA process, signal T1 is down-converted by a mixer 303 and then passed through a narrow-band LPF 304 and low-rate ADC 305 to obtain a narrow-band digital signal B1. The narrow-band digital signals B1 through BN are utilized by baseband processor 312, which performs signal combination and performs digital beamforming or estimating angle of arrival information.

Using digital beamforming method can be beneficial to estimate different UEs' angle of arrival information at the same time. If training symbols of all UEs can be distinguished in spatial or time or frequency or code domain, then the beam administration can be done in one training period. Typically, digital beamforming requires high data rate processing and high complexity. For example, the base station needs to process 128 GHz data when 64 antenna elements with 1 GHz signals are applied. However, by receiving training signals in a narrow band, e.g., one narrow band=1/64 full band, the based station only needs to process 2 GHz data when 64 antenna elements with 1/64 GHz training signals are applied. This way, hardware complexity is reduced.

For high rate data transmission, the receiver receives a plurality of data signals R1 through RN carrying data symbols via the N antennas. Each data signal follows the analog beamforming paths PA-1 to PA-N as depicted by the dashed lines. Taking PA-1 as an example, the data signal R1 is first received by an antenna 301 and passed through an LNA 302. After LNA process, the signal is applied with a phase shifter 306 for outputting signal S1. Signals S1 through SN are then combined by a combining circuit 307. The combined analog signal SC is down-converted by a mixer 308 and then passed through an LPF 309 and an ADC 310 to obtain a digital signal A1. The digital signal A1 is utilized by baseband processor 311, which performs analog beamforming.

In analog beamforming, a set of phase shifter values can be only applied in one training period. One specific antenna pattern is associated with a set of phase shift values. The simplest way to adjust the set of phase shift values is via switched beam method. If N antenna patterns are to be detected, then N training periods are needed. As a result, analog beamforming is time consuming (long switching time) if used for beam training or beam administration. However, for data transmission, analog beamforming can be utilized to effectively reduce hardware complexity. The values of the phase shifters can be adjusted according to the estimated AoA information from past beam training symbols.

Figure 4:
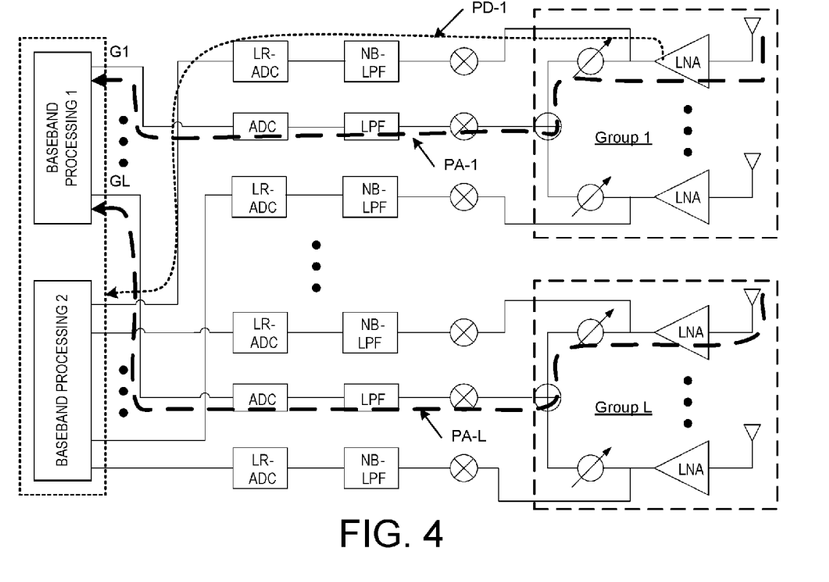
FIG. 4 illustrates a second embodiment of a receiver with combined digital beamforming and hybrid beamforming.

FIG. 4 illustrates a second embodiment of a receiver with combined digital beamforming and hybrid beamforming. FIG. 4 is similar to FIG. 3. In the example of FIG. 4, the N antenna elements are grouped into multiple of L groups. For beam training, similar to FIG. 3, training signals follow digital beamforming paths, e.g., PD-1, and are processed by baseband processor 2. For data transmission, data signals follow analog/hybrid beamforming paths, e.g., PA-1, and are processed by baseband processor 1. In analog/hybrid beamforming, data signals from multiple analog paths PA-1 through PA-L (G1 through GL) are combined and processed together by baseband processor 1 using digital beamforming. The hybrid beamforming can be used for MU-MIMO data transmission. For example, each group of RF chains used for analog beamforming is associated with the data transmission of a different UE.

Figure 5:
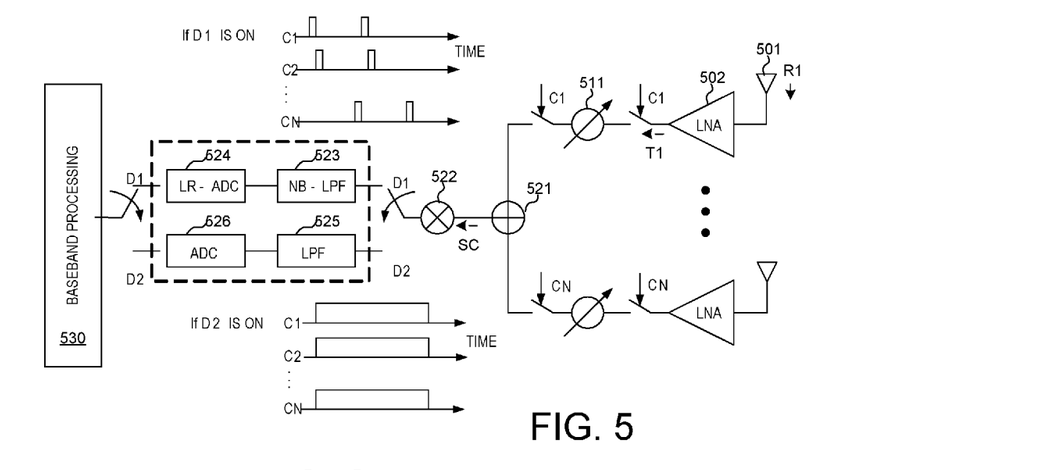
FIG. 5 illustrates a third embodiment of a receiver with combined digital beamforming and analog beamforming.

FIG. 5 illustrates a third embodiment of a receiver with combined digital beamforming and analog beamforming. The receiver comprises components for performing both digital beamforming and analog beamforming. The receiver comprises a plurality of antennas (501) coupled with a plurality of low-noise amplifiers (LNA 502), a plurality of phase shifters (511), a first set of switches C1 to CN, a signal combining circuit 521, a mixer 522, a narrow-band low-pass filter (NB-LPF) 523, a low-rate analog-to-digital converter (LR-ADC) 524, an LPF 525, an ADC 526, a second set of switches D1 and D2, and a baseband processor 530. For beam training, training symbols are transmitted in a narrow band and digital beamforming is applied. For high rate data transmission, data symbols are transmitted in full band or subband and analog beamforming is applied.

In the example of FIG. 5, either beamforming for beam training or for data transmission can be applied simultaneously. A specific period and narrow band training signals are transmitted for beam training. During the specific period, full band data transmission cannot be operated. Assume there are N antennas, N LNAs, and N phase shifters. For example, a first signal R1 is received by antenna 501 and passes through LNA 502 for outputting signal T1. Signal T1 after LNA 502 can select passing phase shifter 511 for analog beamforming or omitting for digital beamforming. Note that for digital beamforming, the value of phase shifter 511 can be one (i.e., zero phase). Switches D1 and D2 control whether analog or digital beamforming is applied.

If D1 is on, then digital beamforming is applied. The timing of the set of switches C1 to CN are serialized in time domain. At a given time slot, each received narrow band training signal passes through a corresponding antenna, LNA, omits the phase shifter and then reaches the signal combining circuit 521. The combined signal SC is then down-converted by mixer 522 and then passed through narrow-band LPF 523 and low-rate ADC 524 to obtain narrow-band digital signals. The narrow-band digital signals are utilized by baseband processor 530, which performs signal combination and performs digital beamforming or estimating AoA information. Note that because each narrow-band training signal is sequentially processed, only one NB-LPF and one LR-ADC are needed as compare to N NB-LPFs and N LR-ADCs are needed in FIG. 3.

If D2 is on, then analog beamforming is applied. The set of switches C1 to CN are turned on simultaneously. Each received wide-band data signal passes through a corresponding antenna, LNA, and phase shifter and then reaches the signal combining circuit 521. The combine signal SC is then down-converted by mixer 522 and then passed through LPF 525 and ADC 526 to obtain a wide-band digital signal. The wide-band digital signal is utilized by baseband processor 530, which performs analog beamforming. Further, note that the LPF 525 and ADC 526 in dashed box 520 can be re-configured as NB-LPF 523 and LR-ADC, respectively. As a result, only one LPF and one ADC are needed.

Figure 6:
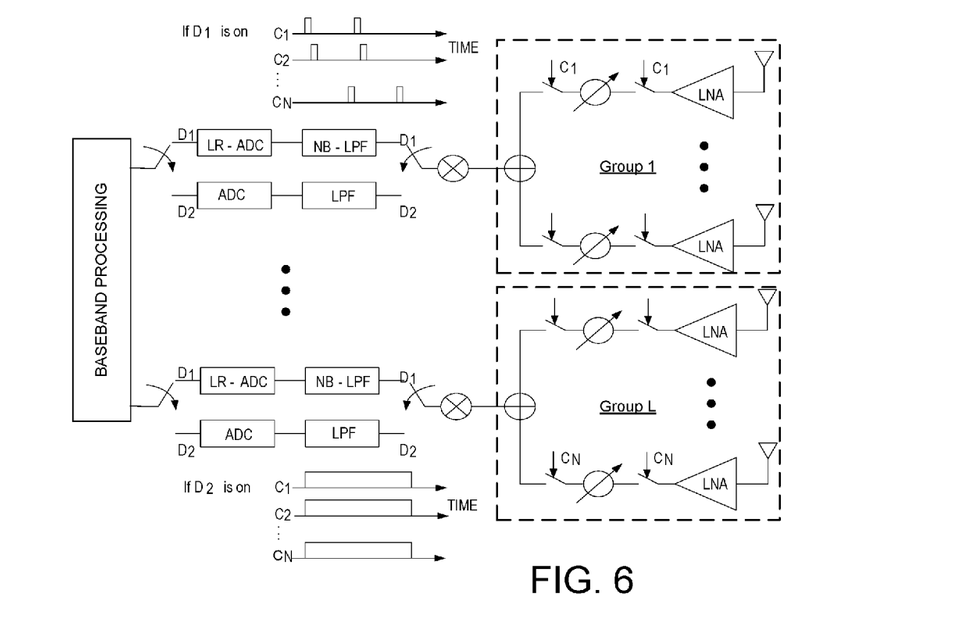
FIG. 6 illustrates a fourth embodiment of a receiver with combined digital beamforming and hybrid beamforming.

FIG. 6 illustrates a fourth embodiment of a receiver with combined digital beamforming and hybrid beamforming. FIG. 6 is similar to FIG. 5. In the example of FIG. 6, the N antenna elements are grouped into multiple of L groups. For beam training, narrowband training signals follow digital beamforming paths when D1 is on. For data transmission, wideband data signals follow analog/hybrid beamforming paths when D2 is on. In analog/hybrid beamforming, data signals from multiple analog paths are combined and processed together by baseband processor 530 using digital beamforming. The hybrid beamforming can be used for MU-MIMO data transmission. For example, each group of RF chains used for analog beamforming is associated with the data transmission of a different UE.

Figure 7:
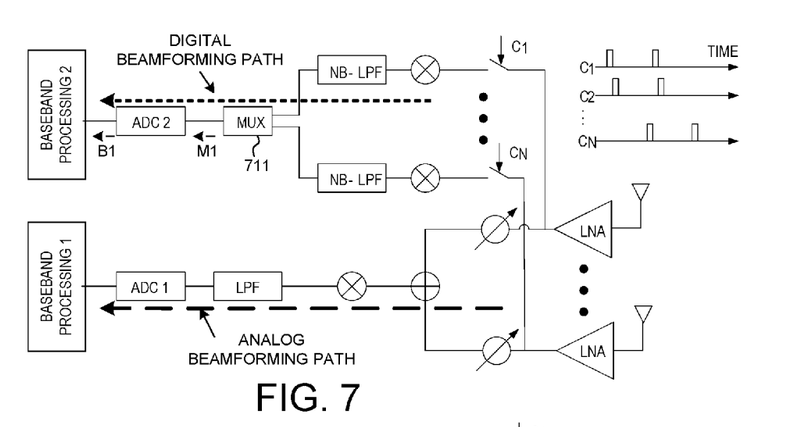
FIG. 7 illustrates a fifth embodiment of a receiver with combined digital beamforming and analog beamforming.

FIG. 7 illustrates a fifth embodiment of a receiver with combined digital beamforming and analog beamforming. FIG. 7 is an alternative of FIG. 3. The receiver comprises components for performing both digital beamforming and analog beamforming. The digital beamformer comprises a plurality of antennas coupled with a plurality of low-noise amplifiers (LNAs), a plurality of mixers, a plurality of narrow-band low-pass filters (NB-LPFs), a mux, an analog-to-digital converter (ADC2), and a baseband processor 2. The analog beamformer comprises the plurality of antennas coupled with the plurality of low-noise amplifiers (LNAs), a plurality of phase shifters, a signal combining circuit, a mixer, a low-pass filter (LPF), an analog-to-digital converter (ADC1), and a baseband processor 1. In accordance with one novel aspect, for beam training, training symbols are transmitted in a narrow band and digital beamforming is applied. For high rate data transmission, data symbols are transmitted in full band or subband and analog beamforming is applied. Furthermore, beam-training symbols can be multiplexed with data symbols in frequency domain and transmitted in the same training period and processed simultaneously.

The digital and analog beamforming paths of FIG. 7 are similar to the digital and analog beamforming paths of FIG. 3. In the example of FIG. 7, however, the digital beamforming path includes a set of sequential high-rate switches C1 to CN as depicted. Under the control of the switches, each narrowband training signal sequentially passes through each NB-LPF, and are multiplexed in time domain by mux 711. The resulted analog signal M1 is then converted to a digital signal B1 by a higher-rate ADC2. Digital signal B1 is then utilized by baseband processor 2, which performs digital beamforming or estimating angle of arrival information. Instead of having a plurality of low-rate ADCs in FIG. 3, FIG. 7 has only one higher-rate ADC2 for digital beamforming.

Figure 8:
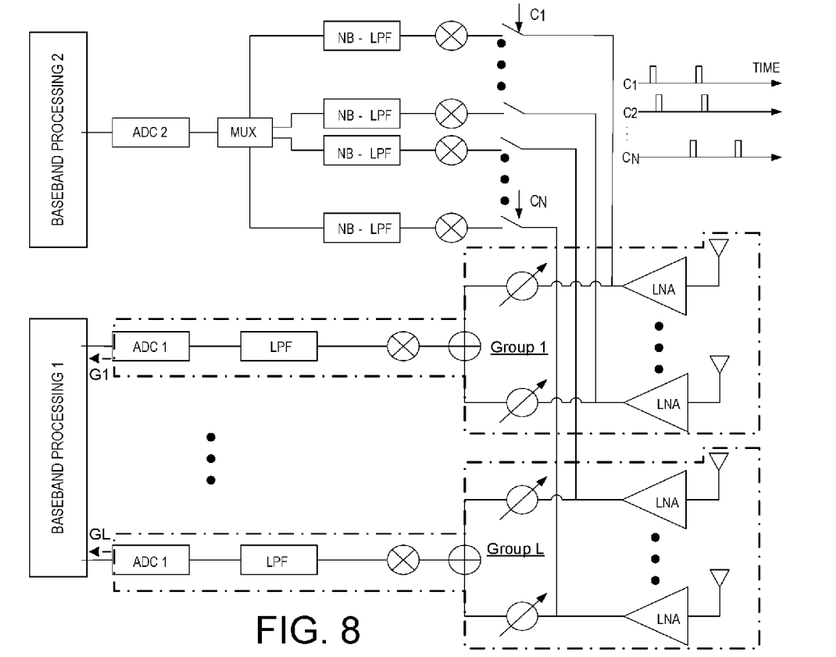
FIG. 8 illustrates a sixth embodiment of a receiver with combined digital beamforming and hybrid beamforming.

FIG. 8 illustrates a sixth embodiment of a receiver with combined digital beamforming and hybrid beamforming. FIG. 8 is similar to FIG. 7. In the example of FIG. 8, the N antenna elements are grouped into multiple of L groups. For beam training, similar to FIG. 7, training signals follow digital beamforming paths and are processed by baseband processor 2. For data transmission, data signals follow analog/hybrid beamforming paths and are processed by baseband processor 1. In analog/hybrid beamforming, data signals from multiple analog paths G1 to GL are combined and processed together by baseband processor 1 using digital beamforming. The hybrid beamforming can be used for MU-MIMO data transmission. For example, each group of RF chains used for analog beamforming is associated with the data transmission of a different UE.

Figure 9:
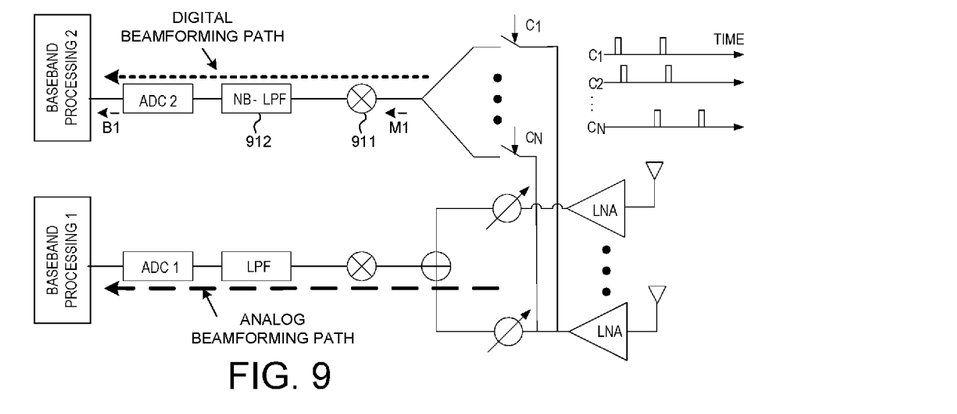
FIG. 9 illustrates a seventh embodiment of a receiver with combined digital beamforming and analog beamforming.

FIG. 9 illustrates a seventh embodiment of a receiver with combined digital beamforming and analog beamforming. FIG. 9 is an alternative of FIG. 7. The digital and analog beamforming paths of FIG. 9 are similar to the digital and analog beamforming paths of FIG. 7. In the example of FIG. 9, however, each narrowband training signal sequentially passes through each switch C1 to CN in time domain and combined as signal M1. Signal M1 is then down-converted by a mixer 911 and then passed through a narrow-band NB-LPF 912 and ADC2 to obtain a digital signal B1. The digital signals B1 is utilized by baseband processor 2, which performs digital beamforming or estimating angle of arrival information. Instead of having a plurality of NB-LPFs in FIG. 7, FIG. 9 has only one NB-LPF to reduce hardware complexity.

Figure 10:
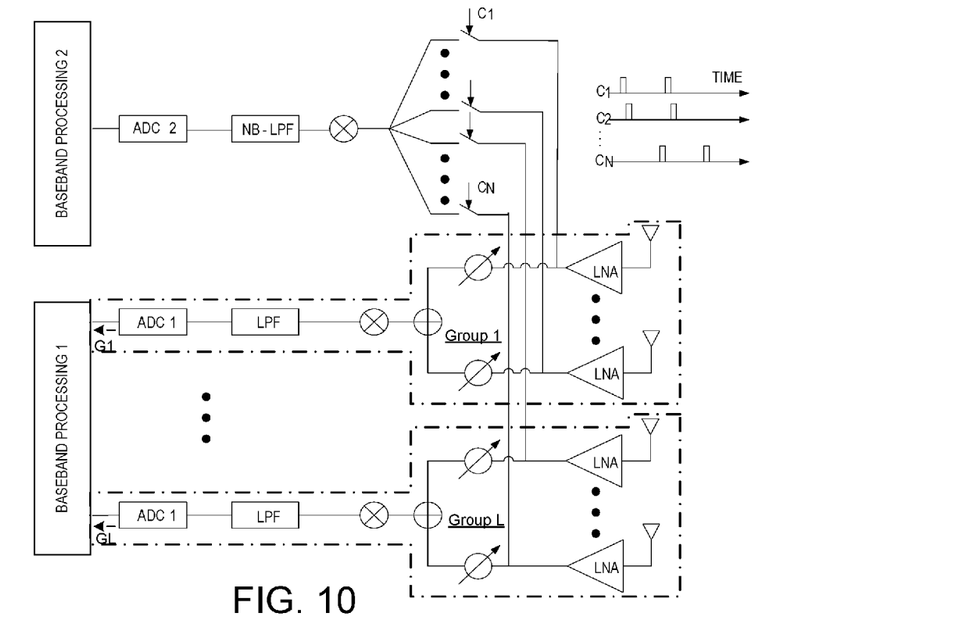
FIG. 10 illustrates an eighth embodiment of a receiver with combined digital beamforming and hybrid beamforming.

FIG. 10 illustrates an eighth embodiment of a receiver with combined digital beamforming and hybrid beamforming. FIG. 10 is similar to FIG. 9. In the example of FIG. 10, the N antenna elements are grouped into multiple of L groups. For beam training, similar to FIG. 9, training signals follow digital beamforming paths and are processed by baseband processor 2. For data transmission, data signals follow analog/hybrid beamforming paths and are processed by baseband processor 1. In analog/hybrid beamforming, data signals from multiple analog paths G1 to GL are combined and processed together by baseband processor 1 using digital beamforming. The hybrid beamforming can be used for MU-MIMO data transmission. For example, each group of RF chains used for analog beamforming is associated with the data transmission of a different UE.

Figure 11:
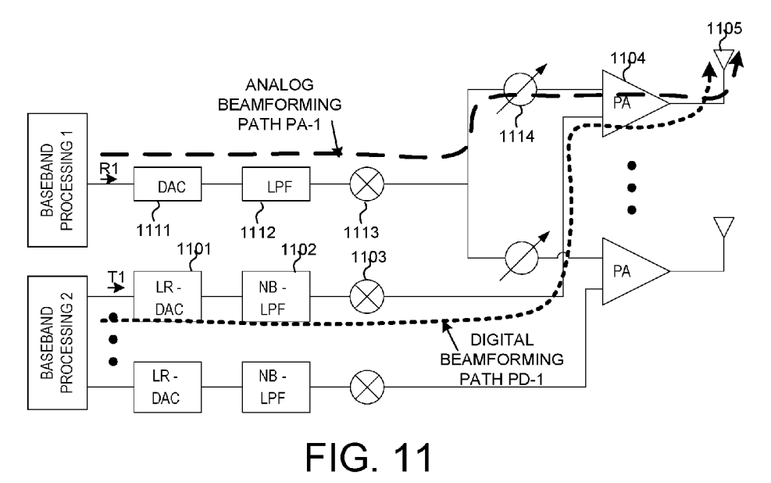
FIG. 11 illustrates a ninth embodiment of a transmitter with combined digital beamforming and analog beamforming.

FIG. 11 illustrates a ninth embodiment of a transmitter with combined digital beamforming and analog beamforming. The transmitter of FIG. 11 is corresponding to the receiver of FIG. 3. The transmitter comprises components for performing both digital beamforming and analog beamforming. The digital beamformer comprises a baseband processor 2, a plurality of low-rate digital-to-analog converters (LR-DACs), a plurality of narrow-band low-pass filters (NB-LPFs), a plurality of mixers, and a plurality of antennas coupled with a plurality of power amplifiers (PAs). The analog beamformer comprises a baseband processor 1, a DAC, an LPF, a mixer, a plurality of phase shifters, and the plurality of antennas coupled with the plurality of power amplifiers (PAs). In accordance with one novel aspect, for beam training, training symbols are transmitted in a narrow band and digital beamforming is applied. For high rate data transmission, data symbols are transmitted in full band or subband and analog beamforming is applied. Furthermore, beam-training symbols can be multiplexed with data symbols in frequency domain and transmitted in the same training period and processed simultaneously.

For beam training, the transmitter transmits a plurality of narrow band training signals carrying training symbols via N antennas. Taking digital beamforming path PD-1 as an example, baseband processor 2 performs digital beamforming by applying phase shifter values and amplitude adjustments on a narrow-band training signal T1. Signal T1 is first converted to analog signal by LR-DAC 1101 and then passed through NB-LPF 1102, up-converted by a mixer 1103, and finally passed through PA 1104 to be transmitted via antenna 1105.

Typically, digital beamforming requires high data rate processing and high complexity. For example, the base station needs to process 128 GHz data when 64 antenna elements with 1 GHz signals are applied. However, by transmitting training signals in a narrow band, e.g., one narrow band=1/64 full band, the based station only needs to process 2 GHz data when 64 antenna elements with 1/64 GHz training signals are applied. This way, hardware complexity is reduced.

For high rate data transmission, the transmitter transmits full band or subband data signals carrying data symbols via N antennas. Taking analog beamforming path PA-1 as an example, a data signal R1 is first generated by baseband processor 1. Signal R1 is converted to analog signal by DAC 1111, passed through LPF 1112, up-converted by a mixer 1113, then applied with a phase shifter 1114, and finally passed through PA 1104 to be transmitted by antenna 1105.

In analog beamforming, a set of phase shifter values can be only applied in one training period. One specific antenna pattern is associated with a set of phase shift values. The simplest way to adjust the set of phase shift values is via switched beam method. If N antenna patterns are to be detected, then N training periods are needed. As a result, analog beamforming is time consuming (long switching time) if used for beam training or beam administration. However, for data transmission, analog beamforming can be utilized to effectively reduce hardware complexity. The values of the phase shifters can be adjusted according to the estimated AoA information from past beam training symbols.

Figure 12:
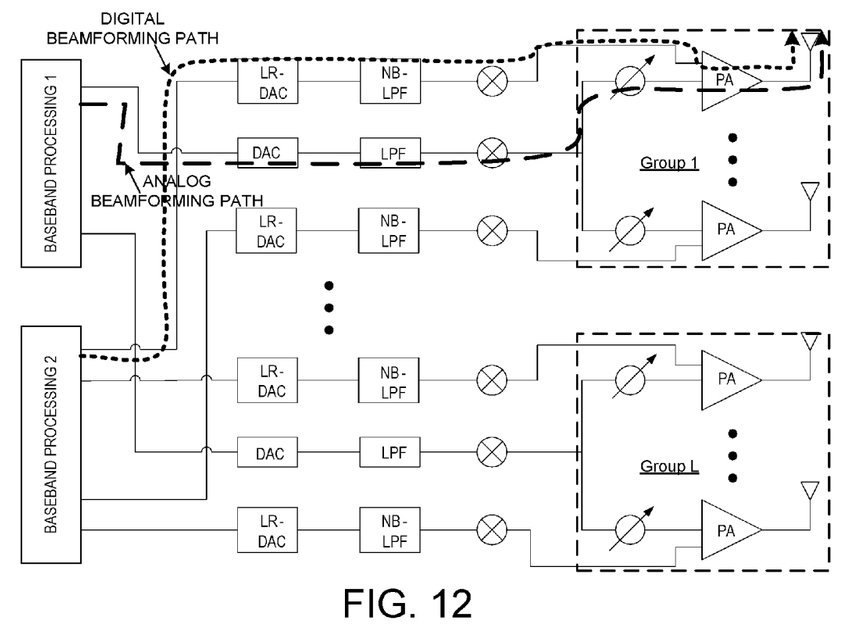
FIG. 12 illustrates a tenth embodiment of a transmitter with combined digital beamforming and hybrid beamforming.

FIG. 12 illustrates a tenth embodiment of a transmitter with combined digital beamforming and hybrid beamforming. FIG. 12 is similar to FIG. 11. In the example of FIG. 12, the N antenna elements are grouped into multiple of L groups. For beam training, similar to FIG. 11, training signals are processed by baseband processor 2 and follow digital beamforming paths. For data transmission, data signals are processed by baseband processor 1 and follow analog/hybrid beamforming paths. In analog/hybrid beamforming, data signals are processed together by baseband processor 1 using digital beamforming and then follow multiple analog paths. The hybrid beamforming can be used for MU-MIMO data transmission. For example, each group of RF chains used for analog beamforming is associated with the data transmission of a different UE.

Figure 13:
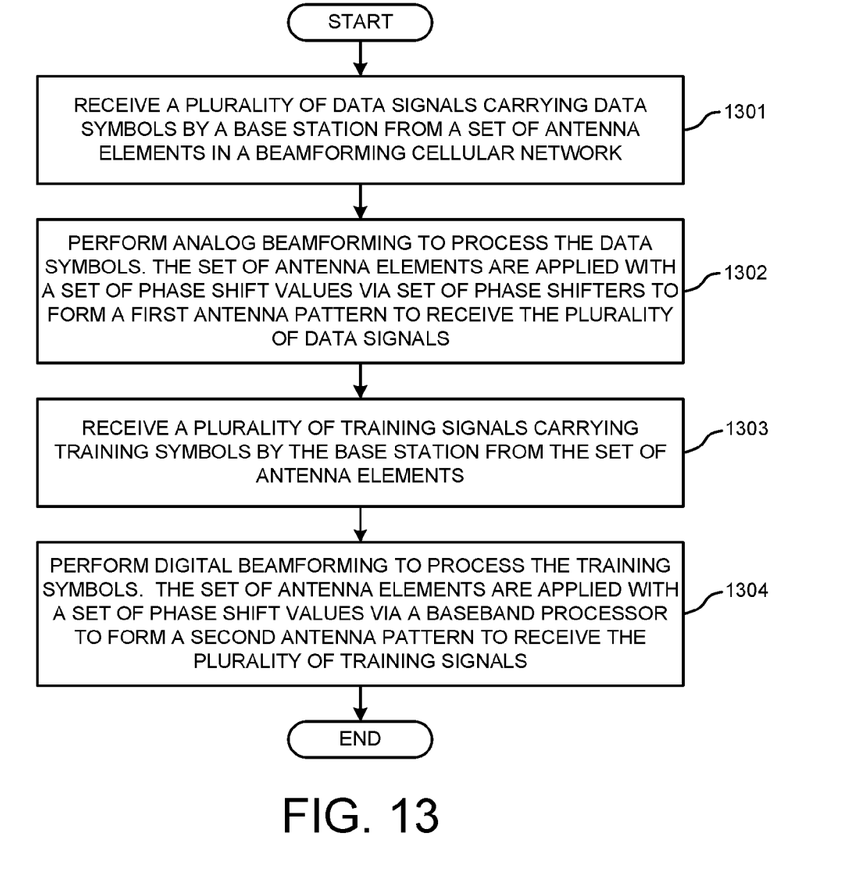
FIG. 13 is a flow chart of a method of combined digital beamforming for beam training with analog/hybrid beamforming for data transmission in a beamforming cellular system in accordance with one novel aspect.

FIG. 13 is a flow chart of a method of combined digital beamforming for beam training with analog/hybrid beamforming for data transmission in a beamforming cellular system in accordance with one novel aspect. In step 1301, a base station receives a plurality of data signals carrying data symbols from a set of antenna elements in a beamforming cellular network. In step 1302, the base station performs analog beamforming to process the data symbols. The set of antenna elements are applied with a first set of phase shift values via a set of phase shifters to form a first antenna pattern to receive the plurality of data signals. In step 1303, the base station receives a plurality of training signals carrying training symbols from the set of antenna elements. In step 1304, the base station performs digital beamforming to process the training symbols. The set of antenna elements are applied with a second set of phase shift values via a baseband processor to form a second antenna pattern to receive the plurality of training signals.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    receiving a plurality of data signals carrying data symbols by a base station from a set of antenna elements in a beamforming cellular network;
    performing hybrid beamforming to process the data symbols, wherein the set of antenna elements are applied with a first set of phase shift values via a set of phase shifters to form a first antenna pattern to receive the plurality of data signals;
    receiving a plurality of training signals carrying training symbols by the base station from the set of antenna elements; and
    performing digital beamforming to process the training symbols, wherein the set of antenna elements are used to form a second antenna pattern for receiving the plurality of training signals.

2. The method of claim 1, wherein the training symbols and the data symbols are multiplexed in frequency domain and processed simultaneously.

3. The method of claim 1, wherein each data signal occupies a wideband, and wherein each training signal occupies a narrow band.

4. The method of claim 1, wherein the training symbols are utilized for estimating an angle of arrival (AoA) of a transmitting device.

5. The method of claim 4, wherein the base station estimate AoA information of multiple transmitting devices simultaneously.

6. The method of claim 4, wherein the phase shift values of the phase shifters are determined based on the estimated AoA of the transmitting device.

7. The method of claim 1, wherein each training signal passes through a narrowband low pass filter (NB-LPF) and a low-rate analog-to-digital converter (LR-ADC) to be processed by a baseband processor.

8. The method of claim 1, wherein the training symbols and the data symbols are processed separately in time domain controlled by a set of switches.

9. The method of claim 1, wherein the plurality of training signals is processed sequentially in time domain controlled by a set of switches.

10. The method of claim 9, wherein the plurality of training signals is processed by a single low pass filter and/or a single analog-to-digital converter.

11. The method of claim 1, wherein the data symbols are grouped into a number of groups to be processed by a combination of analog beamforming and digital beamforming.

12. A wireless device, comprising:
    a plurality of antenna elements that receives a plurality of data signals carrying data symbols in a beamforming cellular network, wherein the plurality of antenna elements also receives a plurality of training signals carrying training symbols;
    a first baseband processor that performs hybrid beamforming to process the data symbols, wherein the antenna elements are applied with a first set of phase shift values via a set of phase shifters to form a first antenna pattern to receive the plurality of data signals; and a second baseband processor that performs digital beamforming to process the training symbols, wherein the antenna elements are used to form a second antenna pattern for receiving the plurality of training signals.

13. The device of claim 12, wherein the training symbols and the data symbols are multiplexed in frequency domain and processed simultaneously.

14. The device of claim 12, wherein each data signal occupies a wideband, and wherein each training signal occupies a narrow band.

15. The device of claim 12, wherein the training symbols are utilized for estimating an angle of arrival (AoA) of a transmitting device.

16. The device of claim 15, wherein the base station estimate AoA information of multiple transmitting devices simultaneously.

17. The device of claim 15, wherein the phase shift values of the phase shifters are determined based on the estimated AoA of the transmitting device.

18. The device of claim 12, wherein each training signal passes through a narrowband low pass filter (NB-LPF) and a low-rate analog-to-digital converter (LR-ADC) to be processed by the second baseband processor.

19. The device of claim 12, wherein the training symbols and the data symbols are processed separately in time domain controlled by a set of switches.

20. The device of claim 12, wherein the plurality of training signals is processed sequentially in time domain controlled by a set of switches.

21. The device of claim 20, wherein the plurality of training signals is processed by a single low pass filter and/or a single analog-to-digital converter.

22. The device of claim 12, wherein the data symbols are grouped into a number of groups to be processed by a combination of analog beamforming and digital beamforming.

* * * * *